(12) United States Patent
Singla et al.

(10) Patent No.: US 11,720,664 B2
(45) Date of Patent: Aug. 8, 2023

(54) METHODS AND SYSTEMS FOR PASSWORD PROTECTION OF DEFINED SPACES WITHIN A MEMORY CARD

(71) Applicant: Western Digital Technologies, Inc., San Jose, CA (US)

(72) Inventors: Lovish Singla, Bangalore (IN); Sandeep Singh, Bangalore (IN); Lovleen Arora, Bangalore (IN); Arunkumar Balasubramanian, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 577 days.

(21) Appl. No.: 16/928,292

(22) Filed: Jul. 14, 2020

(65) Prior Publication Data
US 2022/0019653 A1    Jan. 20, 2022

(51) Int. Cl.
*G06F 21/46* (2013.01)
*G06F 21/79* (2013.01)
*G06F 12/14* (2006.01)
*G06F 21/34* (2013.01)

(52) U.S. Cl.
CPC .......... *G06F 21/46* (2013.01); *G06F 12/1441* (2013.01); *G06F 21/34* (2013.01); *G06F 21/79* (2013.01); *G06F 2212/2146* (2013.01)

(58) Field of Classification Search
CPC ...... G06F 12/1441; G06F 21/34; G06F 21/45; G06F 21/46; G06F 21/79; G06F 2212/2146
See application file for complete search history.

(56) References Cited

PUBLICATIONS

Micron, TN-SD-01 Enabling SD-uSD Card Lock-Unlock in Linux (Aug. 2017) (Year: 2017).*

* cited by examiner

*Primary Examiner* — Theodore C Parsons
(74) *Attorney, Agent, or Firm* — Michael Best & Friedrich LLP

(57) ABSTRACT

Systems, devices, and methods for password protection of defined spaces in a memory device. The method includes receiving a data block from a host. The data block includes a user-defined current password, a user-defined new password, a password length of the current password, a password length of the new password, and a user-defined address range field including start and end addresses of a defined space in the memory device. The method further includes matching password lengths of the user-defined current password and a current password length of a current password for the defined space already stored in the memory device. The method also includes comparing the user-defined current password and the current password of the defined space. The method further includes replacing or resetting the current password of the defined space with the user-defined new password based on a result of the matching and a result of the comparing.

20 Claims, 15 Drawing Sheets

| BYTE # | BIT 7 | BIT 6 | BIT 5 | BIT 4 | BIT 3 | BIT 2 | BIT 1 | BIT 0 |
|---|---|---|---|---|---|---|---|---|
| 0 | RESERVED BITS | | | COP | ERASE | LOCK UNLOCK | CLR_PWD | SET_PWD |
| 1 | PWDS_LEN | | | | | | | |
| 2 ⋮ PWDS_LEN + 1 | PASSWORD DATA | | | | | | | |

FIG. 2 (PRIOR ART)

| | | | | | | |
|---|---|---|---|---|---|---|
| STORED CURRENT PASSWORD | 1 | 2 | 3 | 4 | 5 | ←— 302 |
| USER INPUTTED CURRENT PASSWORD | 1 | 2 | 3 | 4 | 5 | 6 ←— 304 |
| NEW PASSWORD | | 6 | 7 | 8 | 9 | ←— 306 |
| LENGTH CALCULATED BY THE SYSTEM OF NEW PASSWORD | | | 10−5 = 5 | | | ←— 308 |
| RESULT | LOCKED SUCCESSFULLY WITH PASSWORD  6 6 7 8 6 | | | | | ←— 310 |

FIG. 3A (PRIOR ART)  300

| | | | | | |
|---|---|---|---|---|---|
| STORED CURRENT PASSWORD | 1 | 2 | 3 | 4 | ←— 352 |
| USER INPUTTED CURRENT PASSWORD | | 1 | 2 | 3 | ←— 354 |
| NEW PASSWORD | 4 | 5 | 6 | 7 | ←— 356 |
| LENGTH CALCULATED BY THE SYSTEM OF NEW PASSWORD | | | 7−4 = 3 | | ←— 358 |
| RESULT | LOCKED SUCCESSFULLY WITH PASSWORD  5 6 7 | | | | ←— 360 |

FIG. 3B (PRIOR ART)  350

| BYTE # | BIT 7 | BIT 6 | BIT 5 | BIT 4 | BIT 3 | BIT 2 | BIT 1 | BIT 0 |
|---|---|---|---|---|---|---|---|---|
| 0 | RESERVED BITS | | | ERASE | LOCK UNLOCK | CLR_PWD | SET_PWD | DIRECTION OF DATA TRANSFER |
| 1 | CURRENT_PWD_LEN | | | | | | | |
| 2 | NEW_PWD_LEN | | | | | | | |
| 3 ... CURRENT_PWD_LEN +2 | CURRENT PASSWORD | | | | | | | |
| NEW_PWD_LEN + CURRENT_PWD_LEN +2 | NEW PASSWORD | | | | | | | |
| NEW_PWD_LEN + CURRENT_PWD_LEN +2 + 6 BYTES | START ADDRESS | | | | | | | |
| NEW_PWD_LEN + CURRENT_PWD_LEN +2 + 12 BYTES | END ADDRESS | | | | | | | |

FIG. 5

| | | |
|---|---|---|
| ADDRESS RANGE FIELD OF THE DEFINED SPACE (STORED) | FFFFEA-FFFFFC | 702 |
| CURRENT PASSWORD AND CURRENT PASSWORD LENGTH ($L_{STORED\_CURRENT\_PSWD}$) OF THE DEFINED SPACE (STORED) | 1 2 3 & 3 | 704 |
| USER-DEFINED CURRENT PASSWORD AND PASSWORD LENGTH ($L_{CURRENT\_PSWD}$) | 1 2 3 4 & 3 | 706 |
| USER-DEFINED NEW PASSWORD AND PASSWORD LENGTH ($L_{NEW\_PSWD}$) | 5 6 7 8 & 4 | 708 |
| USER-DEFINED ADDRESS RANGE FIELD OF THE DEFINED SPACE | FFFFEA-FFFFFC | 710 |
| MATCH BETWEEN THE ADDRESS RANGE FIELD OF THE DEFINED SPACE AND USER-DEFINED ADDRESS RANGE FIELD OF THE DEFINED SPACE | YES | 712 |
| MATCH BETWEEN ($L_{STORED\_CURRENT\_PSWD}$) AND ($L_{CURRENT\_PSWD}$) | NO | 714 |
| RESULT | LOCK_UNLOCK FAILED ERROR BIT WILL BE SET | 716 |

FIG. 7A

| | | |
|---|---|---|
| ADDRESS RANGE FIELD OF THE DEFINED SPACE (STORED) | FFFFEA-FFFFFC | ←—742 |
| CURRENT PASSWORD AND CURRENT PASSWORD LENGTH ($L_{STORED\_CURRENT\_PSWD}$) OF THE DEFINED SPACE (STORED) | 1 \| 2 \| 3  &  3 | ←—744 |
| USER-DEFINED CURRENT PASSWORD AND PASSWORD LENGTH ($L_{CURRENT\_PSWD}$) | 1 \| 2 \| 3  &  3 | ←—746 |
| USER-DEFINED NEW PASSWORD AND PASSWORD LENGTH ($L_{NEW\_PSWD}$) | 5 \| 6 \| 7 \| 8  &  4 | ←—748 |
| USER-DEFINED ADDRESS RANGE FIELD OF THE DEFINED SPACE | FFFFEA-FFFFFC | ←—750 |
| MATCH BETWEEN THE ADDRESS RANGE FIELD OF THE DEFINED SPACE AND USER-DEFINED ADDRESS RANGE FIELD OF THE DEFINED SPACE | YES | ←—752 |
| MATCH BETWEEN ($L_{STORED\_CURRENT\_PSWD}$) AND ($L_{CURRENT\_PSWD}$) | YES | ←—754 |
| MATCH BETWEEN THE CURRENT PASSWORD AND THE USER-DEFINED CURRENT PASSWORD | YES | ←—756 |
| RESULT | LOCKED SUCCESSFULLY WITH PASSWORD 5678 AND PASSWORD LENGTH 4 | ←—758 |

FIG. 7B       740

| BYTE # | BIT 7 | BIT 6 | BIT 5 | BIT 4 | BIT 3 | BIT 2 | BIT 1 | BIT 0 |
|---|---|---|---|---|---|---|---|---|
| 0 | RESERVED | | | COP | ERASE | LOCK UNLOCK | CLR_PWD | SET_PWD |
| 1 | CURRENT_PWD_LEN | | | | | | | |
| 2 | NEW_PWD_LEN | | | | | | | |
| 3 ⋮ CURRENT_PWD_LEN +2 | CURRENT PASSWORD DATA | | | | | | | |
| CURRENT_PWD_LEN +3 ⋮ CURRENT_PWD_LEN + NEW_PWD_LEN +2 | NEW PASSWORD DATA | | | | | | | |

FIG. 9

| BYTE # | BIT 7 | BIT 6 | BIT 5 | BIT 4 | BIT 3 | BIT 2 | BIT 1 | BIT 0 |
|---|---|---|---|---|---|---|---|---|
| 0 | RESERVED | | | ERASE | LOCK UNLOCK | CLR_PWD | SET_PWD | DIRECTION OF DATA TRANSFER |
| 1 ... 16 | CURRENT PASSWORD DATA | | | | | | | |
| 17 ... 32 | NEW PASSWORD DATA | | | | | | | |
| 33 ... 38 | START ADDRESS | | | | | | | |
| 39 ... 44 | END ADDRESS | | | | | | | |

FIG. 11

METHODS AND SYSTEMS FOR PASSWORD PROTECTION OF DEFINED SPACES WITHIN A MEMORY CARD

BACKGROUND

This application relates generally to memory cards and, more particularly, to techniques for password protection of defined spaces of a memory card.

With the widespread proliferation of electronic devices equipped with the ability to capture media content and with improved network connectivity, the quantum of data being generated and shared has increased exponentially. As data storage needs have increased, organizations and individuals are increasingly sharing storage devices to reduce the overall cost associated with the storage of data. A shared storage device may be partitioned into multiple defined spaces, where each defined space is secured by a respective password. For example, multiple users may partition a Secure-Digital (SD) card and store personal data on their respective partitions. However, securing data stored in each defined space of a shared storage, such as the SD card, can be challenging as the structures defined in the standards, such as the SD Association Physical layer Specification version 6.0, for enabling password protection have several drawbacks. In some scenarios, it has been observed that while attempting to reset the entire SD card or a selected partition within the SD card, the entire SD card or the selected partition was at the risk of being locked with an unintended password.

Therefore, this is a need to provide advanced password protection for defined spaces of storage devices, like memory cards. There is also a need to mitigate the unintended locking of the memory card during the password reset process.

SUMMARY

The disclosure provides a method of password protection of defined spaces in a memory device. The method includes receiving a data block from a host device. The data block includes at least a user-defined current password, a user-defined new password, a password length of the user-defined current password, a password length of the user-defined new password and a user-defined address range field including a start address and an end address of a defined space in the memory device. The method further includes matching the password length of the user-defined current password and a current password length of a current password for the defined space previously stored in the memory device. The method also includes comparing the user-defined current password and the current password of the defined space. The method further includes resetting the current password of the defined space with the user-defined new password based on a result of the matching and a result of the comparing.

The disclose also provides a memory device that includes, in one embodiment, a memory and a controller. The controller is operatively coupled to the memory via a memory interface. The controller is configured to receive a data block from a host device via a card interface. The data block includes at least a user-defined current password, a user-defined new password, a password length of the user-defined current password, a password length of the user-defined new password, and a user-defined address range field including a start address and an end address of a defined space in the memory device. The controller is also configured to match the password length of the user-defined current password and a current password length of a current password for the defined space previously stored in the memory device. The controller is further configured to compare the user-defined current password and the current password of the defined space. The controller is also configured to reset the current password of the defined space with the user-defined new password based on a result of the match and a result of the comparing.

The disclosure also provides a memory card system that includes, in one embodiment, a memory card and a control means. The memory card includes a memory for storing data. The control means is operatively coupled to the memory by way of a memory interface. The control means includes means for receiving a data block via a card interface. The data block includes at least a user-defined current password, a user-defined new password, a password length of the user-defined current password, a password length of the user-defined new password, and a user-defined address range field including a start address and an end address of a defined space in the memory device. The control means further includes means for matching the password length of the user-defined current password and a current password length of a current password for the defined space already stored in the memory card and comparing the user-defined current password and the current password of the defined space. The control means also includes means for replacing the current password of the defined space with the user-defined new password based on a result of the matching and a result of the comparing.

BRIEF DESCRIPTION OF THE DRAWINGS

FIG. 2 is a representation of a locked card data structure according to an SD standard such as SD Association Physical layer Specification version 6.0.

FIG. 3A is a representation of an example of an incorrect password reset in the SD card as per the SD standard.

FIG. 3B is a representation of another example of an incorrect password reset in the SD card as per the SD standard.

FIG. 5 is a representation of a locked card data structure in accordance with an embodiment of the present disclosure in compliance with the SD standard.

FIGS. 7A and 7B are example tables for resetting the current password of the defined space in the memory device in accordance with an embodiment of the present disclosure.

FIG. 9 is a representation of a locked card data structure in accordance with another embodiment of the present disclosure in compliance with the SD standard.

FIG. 11 is a representation of a locked card data structure in accordance with an alternative embodiment of the present disclosure.

DETAILED DESCRIPTION

In the following detailed description, numerous specific details are set forth in order to provide a thorough understanding of the present disclosure. It will be readily apparent to one skill in the art that these specific details are merely exemplary and not intended to limit the scope this application.

Figure 1:
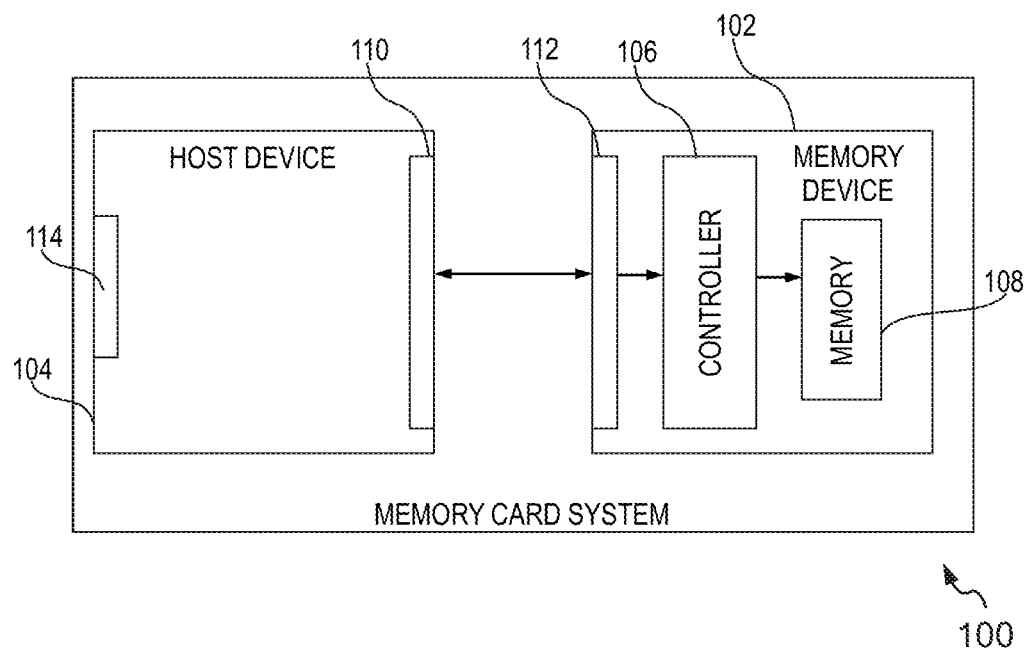
FIG. 1 is a block diagram of a conventional memory card system.

Referring now to FIG. 1, a conventional memory card system 100 includes a memory device 102 and a host device 104. The host device 104 controls data processing operations such as read, write, and erase operations on the memory device 102. The host device 104 includes a user interface 114 and a host interface 110. The memory device 102 includes a controller 106 and a memory 108 such as, but not limited to, a Secure Digital (SD) card, a micro Secure Digital (micro-SD) card, or a MultiMedia Card (MMC). The memory 108 may take the form of an embedded mass storage device, such as an eSD embedded flash drive, embedded in the host device 104.

In one form, the host device 104 may have an SD slot and SD driver software installed thereon for controlling the operation of the SD memory card. In some other forms, the host device 104 may be electrically coupled with the memory device 102 in a variety of other ways, for example, using an external card reader or using other types of electrical interfaces.

According to the SD standard, SD/microSD cards have a lock/unlock function that enables the host device 104 to lock or unlock the memory device 102. The host device 104, as illustrated in FIG. 1, sends a command signal to the controller 106 via a command line, through the host interface 110. The conventional memory card system 100 uses the SD bus protocol for data transmission and reception. In the SD bus protocol, a command is transferred serially from the host device 104 on Command (CMD) line to the controller 106 via a card interface 112 and as an answer to a previously received command, the controller 106 sends a response serially on the CMD line. In an example, data transfer to/from the memory device 102 is done in blocks. In an example, the data blocks are succeeded by cyclic redundancy check (CRC) bits. The host device 104 sends a command such as a CMD7 command to select an SD card from a plurality of SD cards. Further, the host device 104 sends another command such as a CMD42 command to the controller 106 to lock/unlock and/or reset the current password of the selected SD card. The CMD42 command has the same structure and bus transaction type as a regular single block write command. The CMD42 command includes all required information as per the SD standard such as a password setting mode, a user inputted current password, a new password, etc.

Referring to FIG. 2, a locked card data structure 200 is disclosed in accordance with the SD standard. The locked card data structure 200 includes a plurality of byte fields. A byte field 202 is called as a command register in which bit 0 defines password setting mode (see, SET_PWD), bit 1 is used for clear password (see, CLR_PWD), bit 2 represents locking/unlocking status (see, LOCK UNLOCK) of the SD card, bit 3 defines force erase operation (see, ERASE), bit 4 indicates Card Ownership Protection (COP) feature operations (see, COP), and bits 5-7 are reserved bits. The reserved bits are ordinarily set to a pre-defined state, for example, 0. According to the SD standard, a memory card system such as the conventional memory card system 100 can be of two types: COP card and non-COP card. The COP card has an additional feature that prevents re-use of the COP card without knowing the Force Erase Password (FEP). The FEP is stored in an additional 128-bit register with an 8-bit FEP_LEN register. Once the FEP is set, it disables the "Force Erase" and "Clear Password" operations. Further, a COP unlock is required to operate the SD card after power-up when the FEP is set. For the COP unlock, CMD42 with hexadecimal value "1FH" is sent to the memory device 102 to enable any other CMD42 functions.

A PWDS_LEN byte field 204 defines a password length of a password that is inputted by the user. A password data field 206 represents the content of the user inputted password. To reset a current password of the SD card, the PWDS_LEN byte field 204 includes a total password length of user inputted current password (currently used by the user) and a new password. Further, the password data field 206 includes the content of the user inputted current password followed by the content of the new password, for example, [user inputted current password: new password]. The length of the new password is calculated internally by subtracting the length of a stored current password (accessed from the memory 108) from the total password length accessed from the PWDS_LEN byte field 204.

Referring again to FIG. 1, in the existing SD standard, for changing (or resetting) the password of the memory device 102 (interchangeably referred to as "SD card"), the user may enter the user inputted current password followed by the new password. In one illustrative example, the user may enter [user inputted current password: new password] via the user interface 114 on the host device 104. The host device 104 generates the CMD42 command based on inputs from the user and sends the CMD42 command to the controller 106. The controller 106 calculates a length of the new password internally by subtracting a length of the stored current password (accessed from the memory 108) from the total password length accessed from the PWDS_LEN byte field 204 present in the CMD42 command. The controller 106 has length information of the stored current password, and the controller 106 extracts the user inputted current password from the password data field 206 of the CMD42 command based on the length of the stored current password. Further, the remaining characters of the password data field 206 can be considered as the new password intended by the user to reset the password of the memory device 102. For instance, if the length of the stored current password is "3," and the password data field 206 of the CMD42 command includes 8 characters, the controller 106 extracts the first 3 characters from the password data field 206 as the user inputted current password. The controller 106 calculates a length of the new password as equal to the length of the remaining characters i.e. 5. The controller 106 matches the extracted characters with the stored current password accessed from the memory 108. If the content of the extracted password (i.e. the user inputted current password in CMD42 command) and the stored current password matches, the remaining 5 characters of the password data field of the CMD42 command are assumed to be the new password. These remaining characters are used to reset the stored current password. If the content of the extracted password and the stored current password does not match, a Lock_Unlock_Failed error bit (not shown) will be set in a status register that indicates that the password reset of the memory device 102 was not successful.

During the password reset operation in the memory device 102, there may be some scenarios of the memory device 102 getting locked with an unknown or unexpected password. Some examples of the scenarios are—1) when the user inputs extra characters following an old or existing password (see table 300 as shown in FIG. 3A), and 2) when the last few characters of the old or existing password are skipped, but the skipped characters happen to be the first few characters of the new password (see table 350 as shown in FIG. 3B).

In one example, as illustrated in FIG. 3A, the user intends to reset a current password that is "12345" (see, 302). The user enters the current password (i.e. user inputted current password) followed by the new password. In the illustrated example shown in FIG. 3A, the user provides an incorrect current password, for example, the user includes an extra character to the stored current password (see, 304). For instance, the actual current password is "12345", and the user provides the current password as "123456" that has an extra character i.e. "6." The user also provides the new password as "6789" that is intended to reset the current password "12345." After receiving the user inputs, the host device 104 generates the CMD42 command and sends the CMD42 command to the controller 106. In the CMD42 command, the PWDS_LEN byte field 204 has a value of the total password length that is equal to 10 according to the example shown in FIG. 3A. The password data field 206 has the content of the user inputted current password followed by the new password i.e. "1234566786." The controller 106 extracts a predetermined number of initial characters of the password data field 206 based on the length information of the stored current password i.e. "5." For instance, the controller 106 extracts "12345." The controller 106 determines a match between the extracted content i.e. "12345" and the content of actual current password that are same in the illustrated example. The controller 106 calculates a length of the new password by subtracting a length of the current password i.e., "5" from the total password length i.e., "10." The length of the new password calculated by the system is "5" (see, 308 in FIG. 3A). Hence, the memory device 102 is locked successfully with a new password i.e. "66786," defined by the system, of password length "5" (see, 310 in FIG. 3A) that is different from the user-defined new password i.e. "6789" (see, 306 in FIG. 3A). In this example, the memory device 102 is locked by the password "66786," which is unknown to the user, and it leads the memory device 102 to an inoperable state.

In another example, as shown in FIG. 3B, the user intends to reset a current password that is "1234" (see, 352). The user enters a current password (i.e. user inputted current password) followed by the new password. In the illustrated example shown in FIG. 3B, the user provides an incorrect current password, for example, the user misses to include the last character of the stored current password (see 354 in FIG. 3B). For instance, the actual current password is "1234." and the user provides the current password as "123." Further, the user enters the new password i.e. "4567" which starts with the missed last character i.e. "4" of the stored current password (see 356 in FIG. 3B). The host device 104 generates the CMD42 command and sends the CMD42 command to the controller 106. In the CMD42 command, the PWDS_LEN byte field 204 has a value of the total password length that is equal to "8" according to the example shown in FIG. 3B. The password data field 206 has the content of the currently used password followed by the new password i.e., "1234567." The controller 106 extracts a predetermined number of initial characters of the password data field 206 based on the length information of the current password which is "4." For instance, the controller 106 extracts "1234." Thereafter, the controller 106 determines a match between the extracted content i.e. "1234" and the content of actual current password, which are same in the illustrated example. The controller 106 calculates a length of the new password by subtracting a length of the current password (i.e. "4") from the total password length (i.e. "8"). The new password length calculated by the system is "3" (see, 358 in FIG. 3B). Hence, the memory device 102 is locked successfully with a new password i.e. "567," defined by the system, of password length "3" (see, 360 in FIG. 3B) that is different from the user-defined new password i.e. "4567" (see, 356 in FIG. 3B). Hence, in this example, the memory device 102 is locked by the password "567," which is unknown to the user, and this leads the memory device 102 to an inoperable state.

In the above scenarios described in FIGS. 3A and 3B, the reset password is different from the user-defined new password. Accordingly, it is noted that the memory device 102 may be locked with an incorrect password while resetting the current password of the memory device 102 and may lead to an inoperable state in the above scenarios.

Additionally, in conventional scenarios in SD standard, for extending the password protection features for defined spaces in the memory device, an address range field of a defined space may also be sent along with the CMD42 command for resetting the current password of the defined space of the memory device. However, it is noted that the similar scenarios as described in FIGS. 3A and 3B may also occur while resetting the current password of defined space of the memory device. Thus, resetting of the current password of the defined space of the memory may also lead to the inoperable state of the defined space of the memory device. Further, in the existing SD standards, there is no provision available for locking/unlocking of a defined space of the memory card that may be required in case a plurality of users is using the same memory card.

Hence, to address these challenges and to provide other benefits, embodiments of the present disclosure provide a memory card system with an improved setting and password changing (or resetting) method for defined spaces of the memory card. More specifically, various embodiments of present disclosure provide inputting a user-defined new password along with a length of the user-defined new password and a user-defined address range field for a defined space, instead of depending on a process of calculating a length of the new password by subtracting the length of the current password from the total password length for the defined space, thereby enhancing the security of the defined spaces of the memory card system. Some example embodiments of the present disclosure for password protection of defined spaces within the memory device, and a memory card system thereof, are explained with reference to FIGS. 4 to 14.

Figure 4:
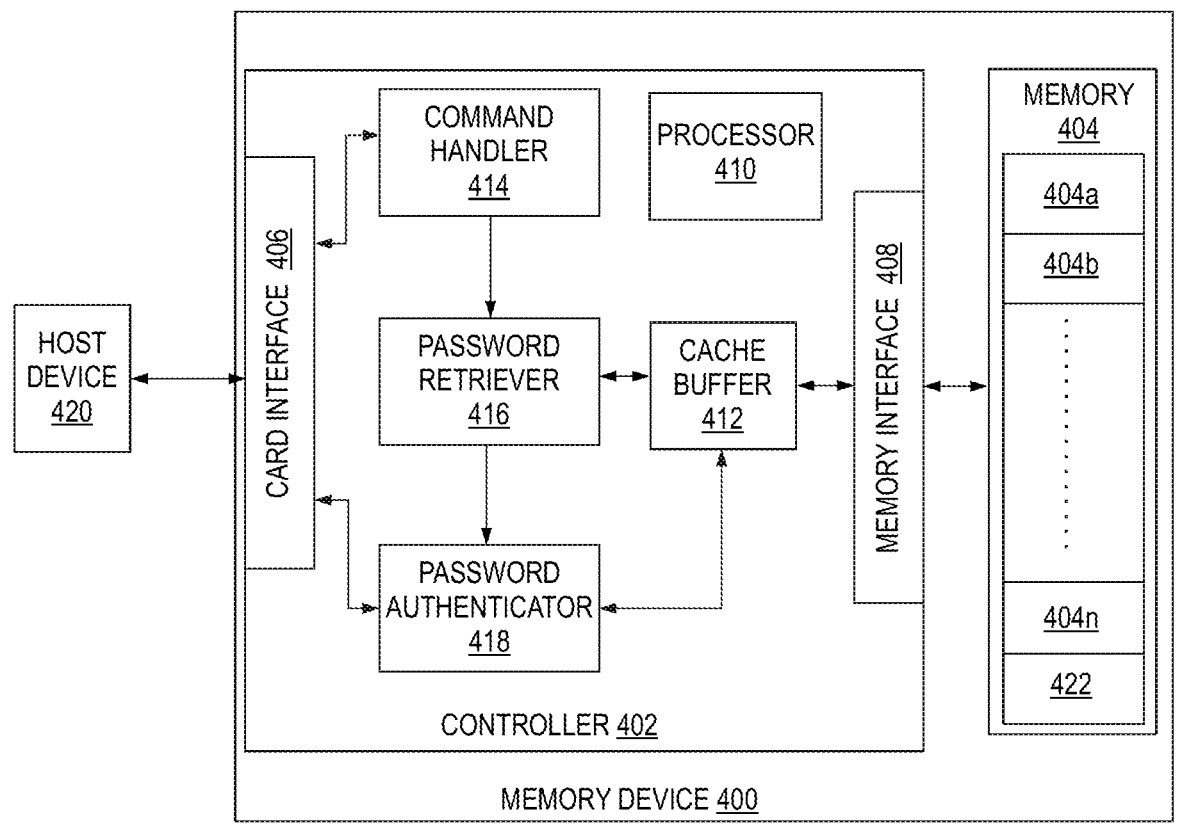
FIG. 4 is a schematic block diagram of a memory device in accordance with an embodiment of the present disclosure.

Referring now to FIG. 4, a memory device 400 is illustrated, in accordance with an embodiment of the present disclosure. The memory device 400 complies with the SD standard. The memory device 400 includes a control means such as a controller 402 and a memory 404. The memory 404 is portioned into a plurality of defined spaces or logical partitions such as, 404a, 404b . . . 404n, where each defined space of the plurality of defined spaces can be of the same size or they can be of different sizes. Each defined space of the memory 404 is associated with a contiguous address range indicating start and end addresses of the defined space. It is noted that each defined space may also be associated with a different password, or there can be more than one defined space that can be associated with the same password.

In one embodiment, password data (e.g., current password and current password length) and address range fields (such as, the start address, the end address, and/or memory region size, etc.) of the plurality of defined spaces can be stored in a password memory space 422. The password memory space 422 can be a highly secure region in the memory 404 that is accessible only by the controller 402, and/or authorized entities (e.g., manufacturer).

The controller 402 manages operations of the memory device 400, such as, it writes to and reads from the memory 404. The controller 402 interfaces with a host device 420 via a card interface 406. The card interface 406 may have MAC and PHY components. The controller 402 interfaces with the memory 404 through a memory interface 408. The controller 402 includes a micro-controller or a processor 410. In an example, the processor 410 may handle the components of the memory device 400 through firmware code. In the depicted embodiment, the controller 402 also includes a volatile memory, such as one or more cache buffer(s) 412 included in the controller 402, for short-term storage or temporary memory during read/write operation of the memory device 400. The cache buffer 412 does not retain stored data if it is powered off.

The controller 402 also includes a command handler 414, a password retriever 416, and a password authenticator 418. In the depicted embodiment, the controller 402 is configured to receive a data block from the host device 420 via the card interface 406. The data block may have a data structure similar to the FIGS. 5, 9, and 11. The command handler 414 is configured to parse the data block and provide content fields of the data block to the password retriever 416. The password retriever 416 is configured to provide the parsed data block information to the password authenticator 418. Further, the password retriever 416 is configured to retrieve stored current password information from the memory through the cache buffer 412 and to provide the stored current password information to the password authenticator 418.

The password authenticator 418 is configured to authenticate the data block based at least on the retrieved current password information. Based on the authentication, the controller 402 is configured to perform memory operations such as, resetting current password of a particular defined space of the memory 404, performing memory access operations for the particular defined space of the memory 404, etc.

Referring now to FIG. 5, a locked card data structure 500 is shown, in accordance with an embodiment of the present disclosure. The locked card data structure 500 maybe compliant with the SD standard. The locked card data structure 500 represents a data block which is sent by a host device (e.g., the host device 420) for password protection of defined spaces of a memory device. It shall be noted that the locked card data structure 500 is different from the locked card data structure 200 of FIG. 2 and is used to overcome the shortcoming associated with the locked card data structure 200.

Without limiting the scope of the present disclosure, in one embodiment, among commands which can be issued by the host device 420, a general command 56 (CMD56) may be utilized for the locked card data structure 500. According to the SD standard, currently, there are no defined commands or usage of the CMD56 and therefore, the CMD56 command can be defined and tailored for vendor-specific requirements. Further, the bus transaction of the CMD56 is the same as the single-block-read or write commands (CMD24 or CMD17). The CMD56 command differs with the single single-block-read or write commands in that the argument (i.e., command register of the CMD56) denotes the direction of the data transfer (rather than the address) and the data block is not the memory payload data but has a vendor-specific format and meaning.

In one embodiment, the locked card data structure 500 may be utilized for password protection or accessing the defined spaces within the memory device. For instance, the locked card data structure 500 may be employed to reset a current password of the memory device or a particular defined spaces within the memory device. The locked card data structure 500 includes a plurality of byte fields. A byte field 502 is called as a command register in which bit 0 defines direction of data transfer, bit 1 is used for set password (see, SET_PWD), bit 2 is used for clear password (see, CLR_PWD), bit 3 represents locking/unlocking status (see, LOCK_UNLOCK) of the memory device, bit 4 defines force erase operation (see, ERASE), and bits 5-7 are reserved bits (see, 516 in FIG. 5).

A CURRENT_PWD_LEN byte field 504 represents a password length of a user-defined current password (currently entered by the user for a defined space of the memory device). The defined space of the memory device represents a memory range. In one embodiment, the password length of the user-defined current password is calculated by the host device 420.

A NEW_PWD_LEN byte field 506 represents a password length of a user-defined new password. In one embodiment, the password length of the user-defined new password is calculated by the host device 420. For instance, once the user provides the new password, the host device 420 calculates the length of the user, defines new password, and populates the password length of the user-defined new password in the locked card data structure 500.

A current password field 508 includes the content of the user-defined current password. Without limiting the scope of the present disclosure, the content of the user-defined current password is stored in number of bytes equivalent to the password length of the user-defined current password (e.g., the content is stored starting from byte 3 till the byte CURRENT_PWD_LEN+2). For example, the password length of the user-defined current password is '4' and the current password is '1234.' The current password takes 4 bytes i.e. starting from byte 3 till the byte 6 in the data block.

A new password field 510 includes the content of the user-defined new password. In one embodiment, the user-defined new password may be, but not limited to, a password phrase, personal identification information (PIN), biometric identification information (e.g., fingerprint, face, IRIS data, etc.). The content of the user-defined new password is stored in number of bytes equivalent to the password length of the user-defined new password (e.g., the content of the user-defined new password is stored starting from byte (CURRENT_PWD_LEN+2) till further (NEW_PWD_LEN) bytes). For example, the password length of the user-defined new password is '3' and the user-defined new password is '567.' The user-defined new password will be stored in 3 bytes i.e. starting from byte 7 till the byte 9 as the new password length is '3' and the current password length was '4.'

The byte fields 512 and 514 include a user-defined address range field associated with the defined space in the memory device. In particular, a start address byte field 512 represents a start address of the defined space of the memory card. The start address is stored in next 6 bytes after the user-defined new password (e.g., the start address of the defined space is stored starting from byte (NEW_PWD_LEN+CURRENT_PWD_LEN+2) till the byte (NEW_PWD_LEN+CURRENT_PWD_LEN+8)). An end address byte field 514 represents an end address of the defined space of the memory card. The end address is stored in next 6 bytes after the start address (e.g., the end address of the defined space is stored starting from byte (NEW_PWD_LEN+CURRENT_PWD_LEN+2+6) till the byte (NEW_PWD_LEN+CURRENT_PWD_LEN+14)).

Further, in order to indicate presence of the user-defined address range field of the defined space in the data block, one of the reserved bits 516 included in the byte field 502 (i.e., command register) may be set. If the reserved bit is set to a first binary value, it means that the user-defined address range field (i.e., the byte fields 512 and 514) should be considered before processing the data block (e.g., resetting the current password of the defined space of the memory device, or setting a new password of the defined space for the first time). If the reserved bit is set to a second binary value, the user-defined address range field should be discarded or ignored and an operation such as, resetting the current password for entire memory space of the memory device, or setting the password for the entire memory space of the memory is performed. Herein, the first and second binary values are different. In a non-limiting example, bit 5 of the byte field 502 may be set to binary value '1' to indicate the presence of the user-defined address range field of the defined space in the data block.

In one example, while setting a new password (or initial password) for a particular defined space of the memory 404, the NEW_PWD_LEN byte field 506 is set to zero and the new password field 510 remains to be empty.

In one example, while performing the memory access operations over a particular defined space of the memory 404, the NEW_PWD_LEN byte field 506 is set to zero and the new password field 510 remains to be empty.

Referring back to FIG. 4, the command handler 414 is configured to receive the data block (i.e., locked card data structure 500) from the host device 420 and parse the data block. The data block is configured for resetting a current password of the memory 404. The command handler 414 is configured to provide the user-defined current password, the user-defined new password, the password length of the user-defined current password, the password length of the user-defined new password, and the user-defined address range field of a defined space within the memory device to the password retriever 416. The password retriever 416 is configured to provide the parsed data block information to the password authenticator 418.

The password authenticator 418 is configured to authenticate the data block based at least on current password information. At first, the password authenticator 418 is configured to find a match between the user-defined address range field and one of a plurality of address range fields corresponding to the plurality of defined spaces in the memory 404. Based on a successful match, the password retriever 416 is configured to retrieve the current password associated with the matched address range field of the defined space from the password memory space of the memory 404 through the cache buffer 412.

Thereafter, the password authenticator 418 is configured to match the password length of the user-defined current password and a current password length of the current password associated with the defined space of the memory 404. The password authenticator 418 is also configured to compare the user-defined current password and the current password of the defined space. The controller 402 is configured to reset the current password of the defined space with the user-defined new password when the password length of the user-defined current password matches the current password length of the current password, the user-defined current password is the same as the stored current password of the defined space, and the user-defined address range field of the defined space determines to be matched with the address range field of the defined space. In one embodiment, the controller 402 is configured to set Lock_Unlock_Failed error bit present in a status register as a bit value '1' based on occurrence of at least one of the password length of the user-defined current password being different from the current password length of the current password, the user-defined current password being different from the current password, and the user-defined address range field being not matched with any address range fields of the plurality of defined spaces of the memory 404.

The controller 402 is also configured to send a response signal to the host device 420 when resetting the current password of the defined space of the memory 404 does not occur.

In one embodiment, while setting a new password (i.e., "first password") of a defined space of the memory 404, the command handler 414 is configured to receive a data block from the host device 420 where the data block includes a command register (with an argument "23H"), a password length of a user-defined new password, the user-defined new password, and an address range field of the memory 404. In this data block, the NEW_PWD_LEN byte field 506 is set to zero and the new password field 510 remains empty. Then, the password authenticator 418 is configured to authenticate the data block and set the new password over the address range field associated with a particular defined space of the memory 404.

Figure 6:
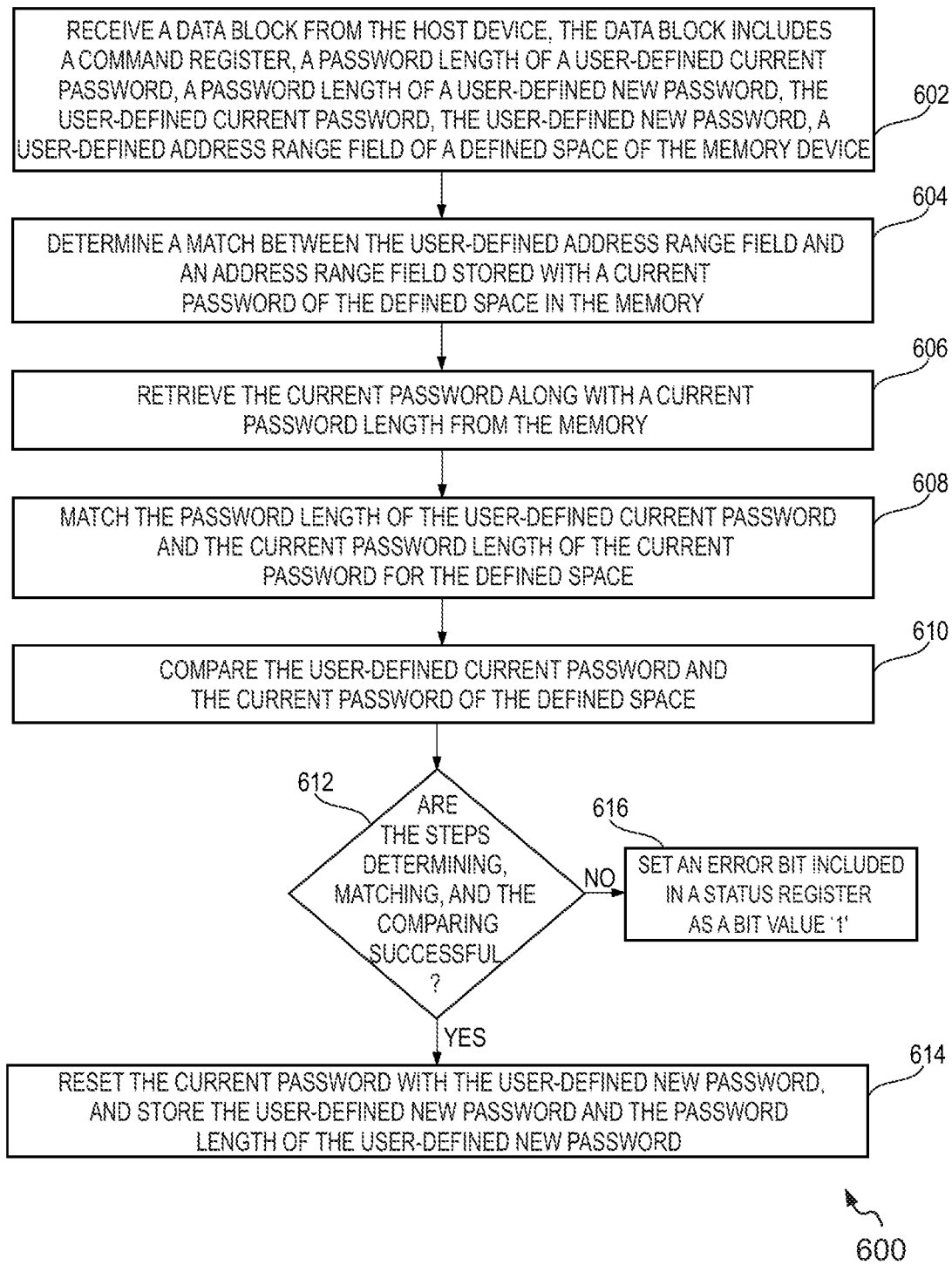
FIG. 6 is a flow chart of a method for resetting a current password of a defined space of a memory device in accordance with an embodiment of the present disclosure.

Referring now to FIG. 6, a flow chart of a method 600 for resetting a current password of a defined space in a memory device is shown, in accordance with an example embodiment of the present disclosure. The method 600 is described with reference to the memory device 400. As mentioned previously, the memory device 400 may include a non-volatile memory and a controller. In at least one implementation, the non-volatile memory is a flash memory, an SD memory card or a micro-SD memory card. One or more operations of method 600 may be performed by the controller 402 executing machine-executable instructions in a non-transitory machine-readable medium by a computer, hardware, a processor (e.g., a microprocessor), and/or machine. The memory device is controlled by a host device, which typically includes a data processing device, such as a central processing unit (CPU), a processor, a microprocessor, or an application specific processor, which can process data. The data processing device may be embedded or implemented in an electronic device, for example, a personal computer (PC), a laptop computer, a mobile telephone, a smartphone, a tablet PC, a personal digital assistant (PDA), an enterprise digital assistant (EDA), a digital still camera, a digital video camera, an audio device, a portable multimedia player (PMP), a personal navigation device or portable navigation device (PND), an MP3 player, a handheld game console, or an e-book.

The method 600 is explained by taking an example of the SD card and the SD standard, however, the method 600 can be applied to other forms of memory devices and standards within the spirit and scope of the present disclosure.

Operation 602 of the method 600 includes receiving a data block from the host device 420. The data block includes a command register, a password length of a user-defined current password, a password length of a user-defined new password, the user-defined current password, the user-defined new password, and a user-defined address range field of a defined space of the memory device. The password length of the user-defined current password can be understood as equal to the number of characters in the user-defined current password of the defined space and can be represented as "$L_{CURRENT\_PSWD}$". Similarly, the password length of the user-defined new password indicates the number of characters of the new password of the defined space and can be represented as "$L_{NEW\_PSWD}$".

Operation 604 includes determining a match between the user-defined address range field and an address range field stored with a current password of the defined space in the memory 404. In an example, the user-defined address range field is searched in the password memory space of the memory 404 to find the matched address range field. It is noted that an address range field of each defined space may be mapped or stored with associated current password and current password length.

Operation 606 includes retrieving (or accessing) the current password along with a current password length ($L_{STORED\_CURRENT\_PSWD}$) from the memory 404 based on the matched address range field.

Operation 608 includes matching the password length ($L_{CURRENT\_PSWD}$) of the user-defined current password and the current password ($L_{STORED\_CURRENT\_PSWD}$) length of the current password for the defined space already stored in the memory device.

Operation 610 includes comparing the user-defined current password and the current password of the defined space.

Operation 612 of the method 600 includes checking if the current password of the defined space can be reset with the user-defined new password based on the steps of the determining, matching, and the comparing (operations 604, 608 and 610). For instance, the current password of the defined space is reset only when the password length ($L_{CURRENT\_PSWD}$) of the user-defined current password matches with the stored password length ($L_{STORED\_CURRENT\_PSWD}$) of the stored current password, the contents of the user-defined current password and the current password of the defined space are the same, and the user-defined address range field of the defined space determines to be matched with an address range field stored with the current password of the defined space. If the reset condition (at operation 612) is satisfied, the method 600 proceeds to operation 614. If the reset condition is not satisfied, the method 600 proceeds to operation 616.

At operation 614, the method includes replacing the current password with the user-defined new password in the memory along with the password length of the user-defined new password.

At operation 616, the method 600 includes setting a Lock_Unlock_Failed error bit present in a status register as a bit value '1' based on occurrence of at least one of: the password length of the current password being different from the stored password length of the stored current password, the user-defined current password being different from the stored current password, and the user-defined address range field of the defined space being not matched with any address range fields of the plurality of defined space stored in the memory 404.

Hence, resetting the current password of the defined space of the memory 404 with unknown or incorrect passwords is avoided, as further explained with reference to FIGS. 7A and 7B.

Referring now to FIG. 7A, an example representation of a password reset method of a defined space of a memory device (e.g., SD card) in a table 700 is illustrated, according to an embodiment of the present disclosure. The user intends to reset a current password of a particular defined space i.e. "FFFFEA" to "FFFFFC" (see, 702 in FIG. 7A) of a SD card (e.g., the memory device 400 as shown in FIG. 4). A current password associated with the particular defined space is stored along with a password length ($L_{STORED\_CURRENT\_PSWD}$) of the current password in the memory (see, 704 in FIG. 7A).

The user enters a user-defined current password "1234" (see, 706) and a user-defined new password "5678" (see, 708), via a user interface, on a host device (e.g., host device 420 as shown in FIG. 4). The user also enters a user-defined address range field including a start address "FFFFEA" and an end address "FFFFFC" associated with the particular defined space (see, 710). The host device 420, upon receiving the user-defined current password and the user-defined new password, calculates a password length ($L_{CURRENT\_PSWD}$) of the user-defined current password (see, 706) and a password length $L_{NEW\_PSWD}$ of the user-defined new password (see, 708). In this example, the user-defined current password (i.e., "1234") is an incorrect current password, as it includes the current password with an extra character. After calculating password lengths, the host device 420 generates a data block (see, 500 of FIG. 5), and sends the data block to a controller (e.g., controller 402 as shown in FIG. 4) of the memory device 400.

The controller 402 accesses the current password (i.e., "123") of the particular defined space and the current password length ($L_{STORED\_CURRENT\_PSWD}$) of the current password from the memory 404. The controller 402 is configured to determine a match between the user-defined address range field and an address range field stored with the current password of the particular defined space of the memory 404 (see 712). Based on the successful match of the address range fields, the controller 402 is again configured to determine a match between the password length ($L_{CURRENT\_PSWD}$) of the user-defined current password and the current password length ($L_{STORED\_CURRENT\_PSWD}$) of the current password (see, 714). As illustrated in the example of FIG. 7A, the password length i.e. "4" of the user-defined current password and the current password length i.e. "3" of the current password are not equal (see, 714), and hence the controller 402 fails to determine a match. Therefore, a Lock_Unlock_Failed error bit present in the status register is set and the password reset of the particular defined space of the memory device 400 is not successful (see, 716). Hence, the embodiments of present disclosure enhance security of the defined spaces of the memory card system by setting the error bit, and by preventing unauthorized or incorrect resetting attempts for the defined spaces.

Referring now to FIG. 7B, another example representation of a password reset method of a defined space of a memory device (e.g., SD card) in a table 740 is illustrated, according to an embodiment of the present disclosure. The user intends to reset a current password of a particular defined space i.e. "FFFFEA" to "FFFFFC" (see, 742) of an SD card (e.g., memory device 400 as shown in FIG. 4). A current password associated with the particular defined space is stored along with a password length ($L_{STORED\_CURRENT\_PSWD}$) of the current password in the memory (see, 744 in FIG. 7A).

The user enters a user-defined current password "123" (see, 746) and a user-defined new password "5678" (see, 748), via the user interface, on the host device 420. The user also enters a user-defined address range field including a start address "FFFFEA" and an end address "FFFFFC" associated with the particular defined space (see, 750). The host device 420, upon receiving the user-defined current password and the user-defined new password, calculates a password length ($L_{CURRENT\_PSWD}$) of the user-defined current password, which is equal to '3' (see, 746) and a password length ($L_{NEW\_PSWB}$) of the user-defined new password, which is equal to '4' (see, 748). In this example, the user-defined current password (i.e., "123") is equal to the current password. The host device 420 generates a data block (see, 500 of FIG. 5), and sends the data block to the controller 402 of the memory device 400.

The controller 402 accesses the current password (i.e. "123") of the particular defined space and the current password length ($L_{STORED\_CURRENT\_PSWD}$) of the current password from the memory 404. The controller 402 determines if there is a match between the user-defined address range field and an address range field stored with the current password of the particular defined space of the memory 404 (see 752). Based on the successful match of the address range fields, the controller 402 again determines if there is a match between the password length ($L_{CURRENT\_PSWD}$) of the user-defined current password and the current password length ($L_{STORED\_CURRENT\_PSWD}$) of the current password (see, 754). Thereafter, the controller 402 matches the current password and the user-defined current password (see, 756). As illustrated in the example of FIG. 7B, the password length of the user-defined current password and the current password length i.e. "3" of the current password are equal (see, 754), and the user-defined current password and the current password are the same (see, 756). Hence, based on the result of matching and comparing steps, the password reset of the defined space of the memory device is successfully reset with the new password i.e. "5678" and the password length of the new password i.e. "4" is stored in the memory along with the new password i.e. "5678" for the defined space with the start address FFFFEA and the end address FFFFFC (see, 758).

Figure 8:
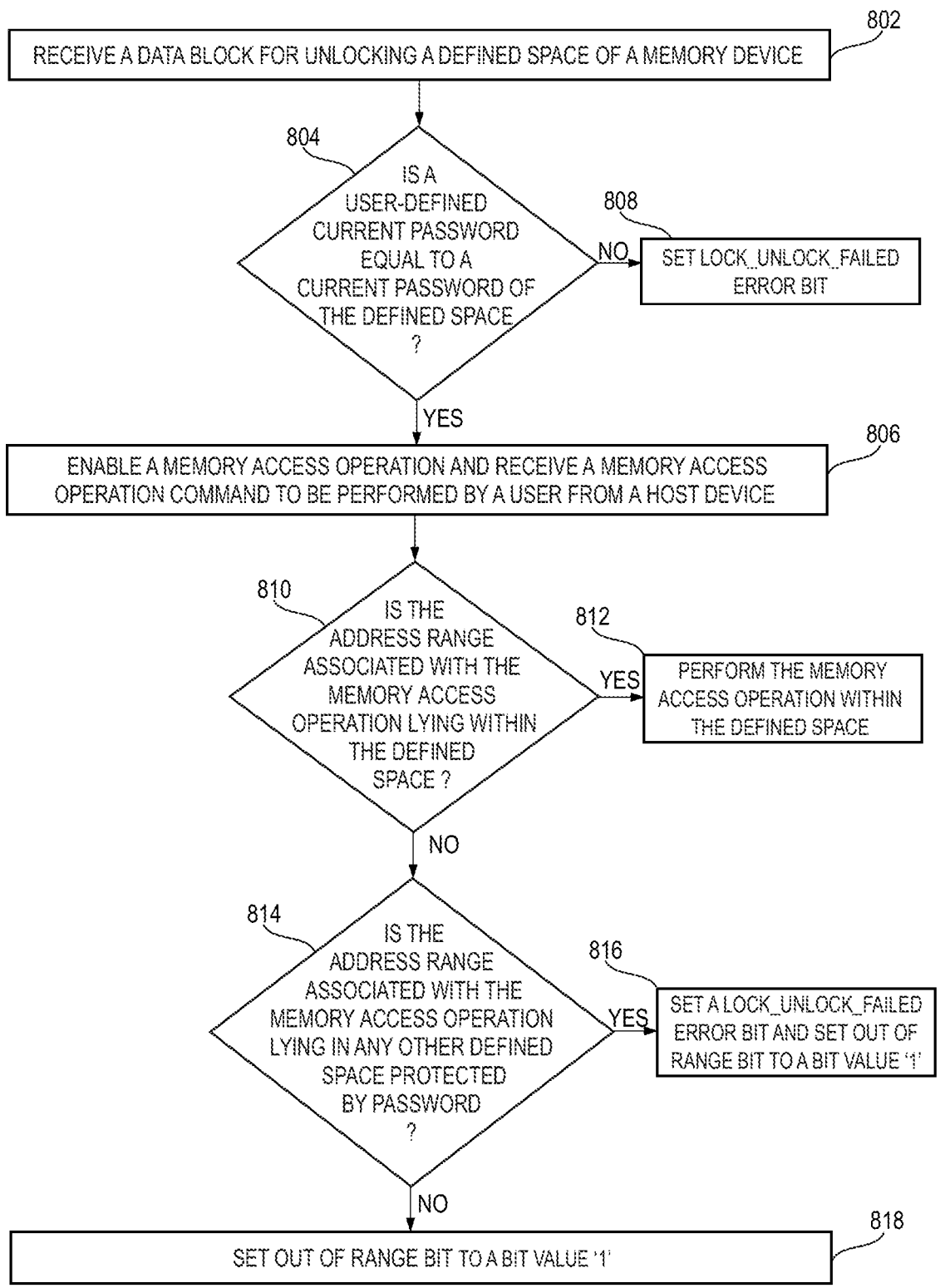
FIG. 8 is a flow chart of a method for performing memory access operations within the defined space of the memory device in accordance with an embodiment of the present disclosure.

Referring now to FIG. 8, a flow chart of a method 800 for performing memory access operations within a defined space of a memory device is shown, in accordance with an example embodiment of the present disclosure. The memory access operations that can be performed by the user are at least one of read, write, and erase. The method 800 is described with reference to the memory device 400 that is controlled by a host device 420.

Operation 802 of the method 800 includes receiving another data block (e.g., the locked card data structure 500) from the host device 420 for unlocking a defined space of the memory device. In this data block, the NEW_PWD_LEN field is set to zero, and the new password field 510 is set to be empty. This data block includes a command register (with an argument "1H"), a user-defined current password of the defined space, a password length of the user-defined current password, and a user-defined address range field (including start and end addresses) associated with the defined space.

Operation 804 of the method 800 includes comparing the user-defined current password with a current password of the defined space. In one embodiment, the current password already stored in the memory 404 is identified based on a matching of the user-defined address range field with an address range field associated with the current password.

When the user-defined current password is similar, in terms of content and password length, to the current password of the defined space, the method 800 proceeds to operation 806, otherwise, the method 800 proceeds to operation 808.

Operation 806 of the method 800 includes enabling the memory access operation and receiving a memory access operation command associated with the access operation to be performed by a user from the host device 420. The memory access operation command includes information of an address range of a space of the memory 404 where the memory access operation needs to be performed.

Operation 808 of the method 800 includes setting a Lock_Unlock_Failed error bit present in a status register as a bit value '1.'

Operation 810 of the method 800 includes checking whether the address range associated with the memory access operation lies within the defined space or not. If the address range associated with the memory access operation lies within the address range field of the defined space, the method 800 proceeds to operation 812, otherwise the method 800 proceeds to operation 814.

Operation 812 of the method 800 includes performing the memory access operation within the defined space of the memory device.

Operation 814 of the method 800 includes checking whether the address range associated with the memory access operation falls in any other defined space of the memory device that is protected by a password. If the address range falls in a defined space of the memory device that is protected by the password, the method 800 proceeds to operation 816, otherwise the method 800 proceeds to operation 818.

Operation 816 of the method 800 includes setting a Lock_Unlock_Failed error bit and an out of range error bit present in a status register as a bit value '1.'

Operation 818 of the method 800 includes setting the out of range error bit present in the status register as a bit value '1.' In this scenario, the out of range error bit will be set but the user is allowed to perform the memory access operation in the desired space of the memory device.

Referring now to FIG. 9, a locked card data structure 900 is shown, in accordance with another embodiment of the present disclosure. The locked card data structure 900 may be compliant with the SD standard. It shall be noted that the locked card data structure 900 is an improved version of the locked card data structure 200 of FIG. 2. The locked card data structure 900 is used to overcome the shortcoming associated with the locked card data structure 200, such as the problem of the locking of the memory card with an incorrect password while changing (or resetting) a current password of whole memory card. The locked card data structure 900 includes a plurality of byte fields. A byte field 902 (i.e., command register) is similar to the byte field 202 in terms of basic architecture, hence the byte field 902 is not explained herein again for the sake of brevity. In the byte field 902, one of the reserved bits (i.e., bit 6) is set to a first binary value for indicating the presence of a new password length byte field (NEW_PWD_LEN) 906 in the data block.

A CURRENT_PWD_LEN byte field 904 defines a password length ($L_{CURRENT\_PSWD}$) of a user-defined current password (currently used by the user for the memory card). The NEW_PWD_LEN byte field 906 defines a password length ($L_{NEW\_PSWD}$) of a user-defined new password. A current password field 908 represents a content of the user-defined current password. The content of the user-defined current password is stored in a number of bytes equivalent to the password length ($L_{CURRENT\_PSWD}$) of the user-defined current password (i.e., the content is stored starting from byte 3 till the byte CURRENT_PWD_LEN+2). For example, the password length ($L_{CURRENT\_PSWD}$) of the user-defined current password is '6' and the current password is '123456.' The current password will be stored in 6 bytes i.e. starting from byte 3 till the byte 8 as the password length is '6.' A new password field 910 represents the content of the user-defined new password. The content of the user-defined new password is stored in the number of bytes equivalent to the password length of the user-defined new password (i.e., the content of the new password is stored starting from byte (CURRENT_PWD_LEN+3) till the byte (CURRENT_PWD_LEN+NEW_PWD_LEN+2)). In the above example, the password length of the user-defined new password is '3' and the new password is '567.' Further, in this example, the new password will be stored in 3 bytes i.e. starting from byte 9 ('6'+'3') till the byte 11 ('6'+'3'+'2') as the new password length is '3' and the current password length is '6'.

With the locked card data structure 900, the issue of the locking of the memory card with an incorrect password while changing (or resetting) the current password of the memory card is eliminated. For instance, in the illustrated embodiment, for changing (or resetting) the password of the memory device, the user just needs to enter the user-defined current password followed by the user-defined new password, for example, [user-defined current password: user-defined new password], via the user interface, on the host device 420. The host device 420, upon receiving the user-defined current password and the user-defined new password, calculates the password length ($L_{CURRENT\_PSWD}$) of the user-defined current password and the password length ($L_{NEW\_PSWD}$) of the user-defined new password. Thereafter, the host device 420 generates a CMD42 command based on inputs provided by the user and the calculated password lengths. The host device then sends the CMD42 command to the controller 402.

The controller 402 parses the CMD42 command and extracts user-defined current password, user-defined new password, the password length ($L_{CURRENT\_PSWD}$) of the user-defined current password, and the password length ($L_{NEW\_PSWD}$) of the user-defined new password. The controller 402 retrieves a current password and a current password length ($L_{STORED\_CURRENT\_PSWD}$) of the current password from the memory 404. The current password is used to protect the entire memory space of the memory 404. The controller 402 matches the password length ($L_{CURRENT\_PSWD}$) of the user-defined current password with the current password length ($L_{STORED\_CURRENT\_PSWD}$) of the current password accessed from the memory 404 and compares contents of the user-defined current password and the current password of the memory device.

In one embodiment, the controller 402 resets the current password of the memory device 400 with the user-defined new password when the password length ($L_{CURRENT\_PSWD}$) of the user-defined current password matches the current password length ($L_{STORED\_CURRENT\_PSWD}$) of the current password and the user-defined current password is the same as the current password of the memory device. In an example, the controller 402 sets the Lock_Unlock_Failed error bit present in the status register as a bit value '1' based on the occurrence of at least one of: the password length of the user-defined current password is different from the current password length of the current password, and the user-defined current password is different from the current password.

Figure 10:
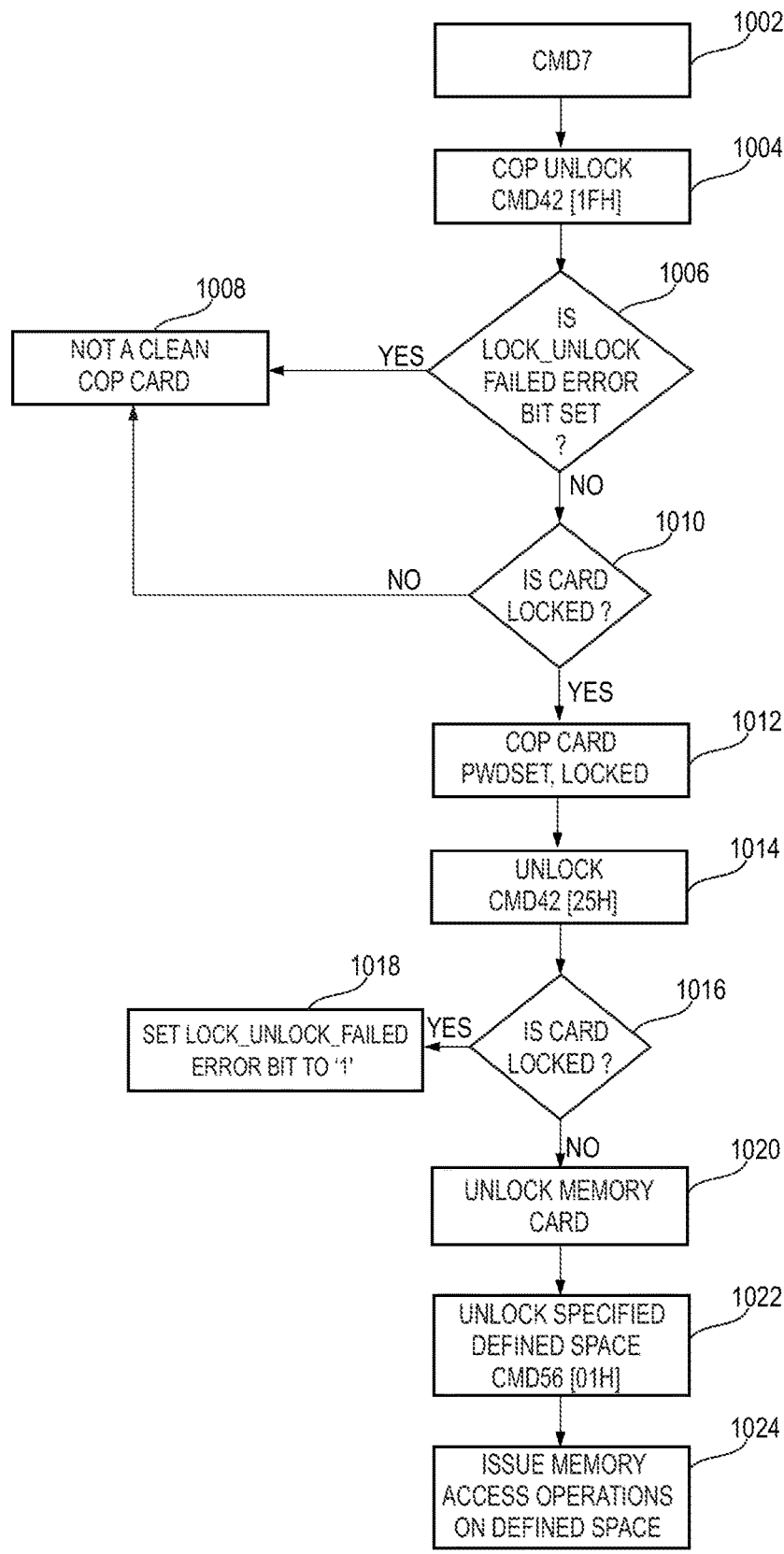
FIG. 10 is a flow chart of a method for performing one or more operations in a defined space of a Content Ownership Protection (COP) secure digital (SD) card in accordance with an embodiment.

Referring now to FIG. 10, a flow chart 1000 of performing one or more access operations in a defined space of a COP memory card is disclosed, in accordance with various embodiments of the present disclosure. The host device 420 sends a CMD7 command for selecting a memory device card from a plurality of memory cards (S1002). The host device then sends CMD42 command with the argument "1FH" for unlocking the COP memory card (S1004). The status of a Lock_Unlock_Failed error bit in a status register is determined (S1006). If the Lock_Unlock_Failed error bit present in the status register is set (S1006=Yes), the memory card is called as "not a clean COP memory card" (S1008). If the Lock_Unlock_Failed error bit is not set, the COP card locking status is determined (S1010). When the COP memory card is locked (S1010=Yes), it means that the COP memory card is locked with a password (S1012). When the card is unlocked (S1010=No), the COP memory card is called as "not a clean COP memory card" (S1008).

Further, for unlocking the COP memory card, the host device 420 sends a data block (e.g., locked card data structure 900) to the controller 402 using a CMD42 command with an argument "25H" in the command register (S1014). At S1016, a match between the password length of the user-defined current password and a current password length of a current password, and a match between the user-defined current password and the current password are determined. If the matches occur (S1016=Yes), the whole memory card is unlocked (S1020). If the matching does not occur (S1016=No), the Lock_Unlock_Failed error bit present in the status register is set to a bit value '1' (S1018).

Thereafter, for unlocking a specific defined space of the COP memory card, the host device 420 sends a data block (e.g., locked card data structure 500) to the controller 402 using a CMD56 command with an argument "01H" in the command register (S1022). The controller 402 unlocks the specific defined space of the COP card memory when the password length of the user-defined current password matches the current password length of the current password, the user-defined current password is the same as current password of the specific defined space, and a user-defined address range field of the specific defined space included in the CMD56 determines to be matched with an address range field of the specific defined space already stored with the current password. If the matching occurs, the defined space is unlocked and memory access operations (such as, read, write, or erase) are issued to be performed on the specific defined space (S1024).

Referring now to FIG. 11, a locked card data structure 1100 is shown, in accordance with another embodiment of the present disclosure. The locked card data structure 1100 maybe compliant with the SD standard. It shall be noted that the locked card data structure 1100 is similar to the locked card data structure 500 of FIG. 5 with some slight variations and is used to eliminate the need of performing computations which were required in other methods. According to the FIGS. 3A and 3B, password resetting problems in the SD card generally occur due to concatenation of passwords [user defined current password: user defined new password], therefore, in the present embodiment, the concatenation process is removed so that both the passwords are mutually exclusive of each other.

In one embodiment, a general command 56 (CMD56) may be utilized for the locked card data structure 1100. The locked card data structure 1100 includes a plurality of byte fields. A byte field 1102 is called as a command register in which bit 0 defines direction of data transfer, bit 1 is used for set password (see, SET_PWD), bit 2 is used for clear password (see, CLR_PWD), bit 3 represents locking/unlocking status (see, LOCK_UNLOCK) of the memory device, bit 4 defines force erase operation (see, ERASE), and bits 5-7 are reserved bits (see, 1112 in FIG. 11).

A current password field 1104 represents the content of a user-defined current password. In one implementation, the content of the user-defined current password is stored in a fixed number of bytes i.e. "16," which eliminates the need of storing a password length. So, the user can provide user-defined current password anything ranging between 1 byte to 16 bytes and the host device concatenates the rest of the bytes with zero padding values in case the user-defined current password is less than 16 bytes. In one example, if the password length of the user-defined current password is equal to 6 bytes, the host will add the additional bytes i.e. '10' bytes before sending it to the memory device 400. The controller 402 may then extract the user-defined current password from the current password field 1104. In an embodiment, the controller 402 may use a defined set of delimiters (e.g., spaces, equal signs, colons, semicolons, etc.) for differentiating between the user-defined current password and the additional bytes added by the host. In other words, the controller 402 reads the content of the current password field 1104 until the controller 402 detects the delimiter. While the maximum bytes for the user-defined current password allowed with reference to the present disclosure is 16 bytes, this is not meant to be limiting; in various embodiments, more or less maximum bytes for the user-defined current password may be employed.

A new password field 1106 represents content of a user-defined new password. In similar fashion, the content of the user-defined new password is again stored in a fixed number of bytes (e.g., next 16 bytes) from byte 17 to byte 32. The byte fields 1108 and 1110 include a user-defined address range of the defined space of the memory 404. The start address byte field 1108 represents a start address of the defined space of the memory card. The start address is stored in next 6 bytes after the user-defined new password i.e. from byte "33" till byte "38." The end address byte field 1110 represents an end address of the defined space of the memory card. The end address is stored in next 6 bytes after the start address i.e. from byte "39" till byte "44."

Further, in order to indicate presence of the user-defined address range field of the defined space in the data block, one of the reserved bits 1112 included in the byte field 1102 may be set. If the reserved bit is set to a first binary value, the user-defined address range field should be considered before resetting of the current password of the defined space of the memory device. If the reserved bit is set to a second binary value, the user-defined address range field should be discarded or ignored and resetting a current password for entire memory space of the memory device is performed. Herein, the first and second binary values are different. For instance, in an example, bit 5 of the byte field 1112 may be set to indicate presence of the user-defined address range field of the defined space in the data block.

Figure 12:
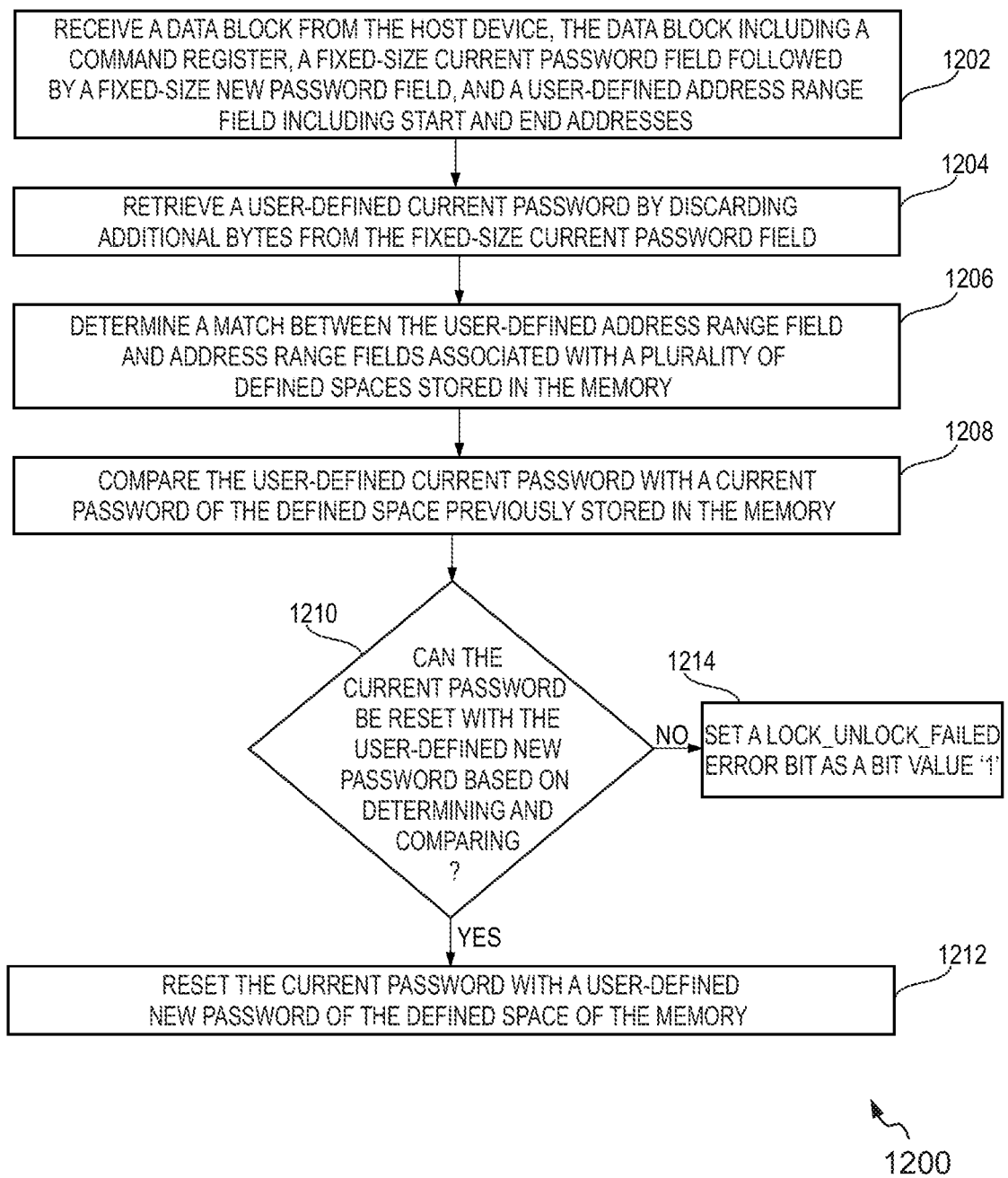
FIG. 12 is a flow chart of a method for resetting a current password of the defined space of the memory device, in accordance with an alternative embodiment of the present disclosure.

Referring now to FIG. 12, a flow chart of a method 1200 for resetting a current password of a defined space of a memory device using the locked card data structure 1100 is shown, in accordance with another example embodiment of the present disclosure. The method 1200 is described with reference to the memory device 400 that is controlled by a host device 420. The method 1200 is explained by taking an example of the SD card and the SD standard, however, the method 1200 can be applied to other forms of memory devices and standards as well.

Operation 1202 of the method 1200 includes receiving a data block from the host device 420. The data block includes a command register, a fixed-size current password field followed by a fixed-size new password field, and a user-defined address range field including start and end addresses.

Operation 1204 of the method 1200 includes retrieving a user-defined current password by discarding additional zero-padded bytes from the fixed-size current password field.

Operation 1206 of the method 1200 includes determining a match between the user-defined address range field (i.e., start and end addresses) and address range fields associated with a plurality of defined spaces which are already stored in the memory.

Operation 1208 of the method 1200 includes comparing the user-defined current password with a current password of the defined space already stored in the memory 404. The current password is retrieved from the memory 404 based on the matching of the user-defined address range field with an address range field associated with the current password.

Operation 1210 of the method 1200 includes checking if the current password can be reset with the user-defined new password based on the steps of the matching and the comparing (operations 1206 and 1208). For instance, the current password is reset only when the user-defined address range field matches with the address range field stored in the memory, and the user-defined current password and the current password associated with the address range field are the same. If the reset condition (at operation 1210) is satisfied, the method 1200 proceeds to operation 1212. If the reset condition is not satisfied, the method 1200 proceeds to operation 1214.

Operation 1212 of the method 1200 includes resetting the current password with the user-defined new password that is retrieved from the new password field 1106 after discarding zero-padded bytes and storing the user-defined new password in the memory.

Operation 1214 of the method 1200 includes setting a Lock_Unlock_Failed error bit present in a status register as a bit value '1' based on the occurrence of at least one of: the user-defined current password is different from the stored current password of the defined space; and the start address and the end address of the defined space being different from the stored start address and end address of the defined space.

Figure 13:
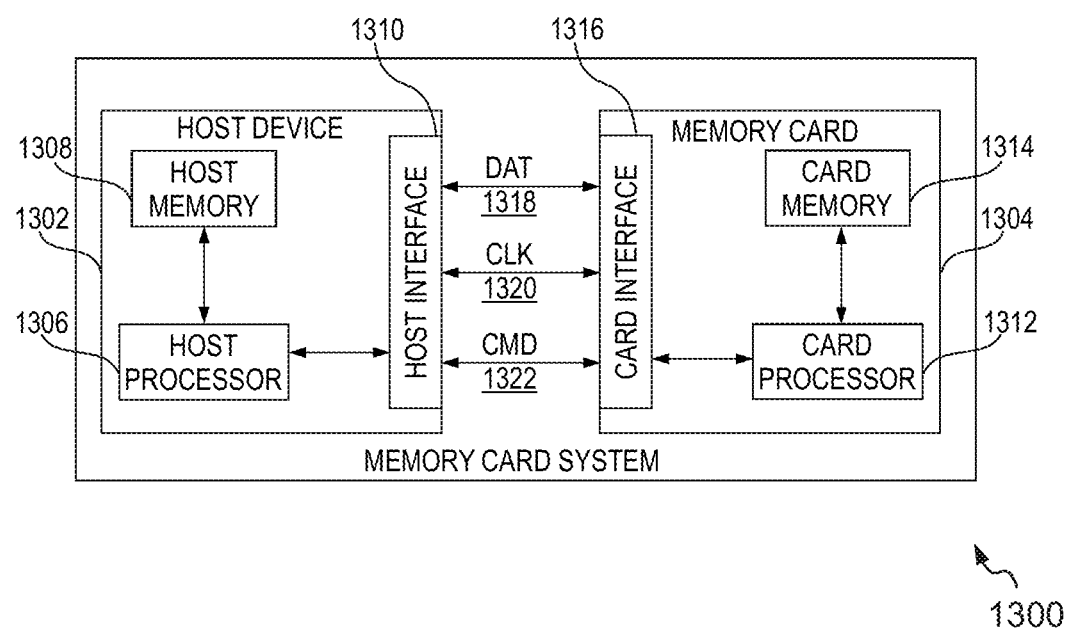
FIG. 13 is a block diagram of a memory card system related to at least some embodiments of the present disclosure.

Referring now to FIG. 13, a memory card system 1300 is illustrated, in accordance with another embodiment of the present disclosure. The memory card system 1300 operates in compliance with the SD standard. The memory card system 1300 is portioned into a plurality of memory regions that are referred as defined spaces of the memory card system 1300. The plurality of defined spaces enables the memory card system to be used by a plurality of users. Each defined space can be protected by a password.

The memory card system 1300 includes a host device 1302 and a memory card 1304. The host device 1302 includes a host processor 1306, a host memory 1308, and a host interface 1310. The memory card 1304 includes a card processor 1312, a card memory 1314, and a card interface 1316. The memory card 1304 may be a secure digital (SD) memory card or a micro-SD memory card. Alternatively, the memory card 1304 may be other types of memory cards such a Multi-Media Card (MMC). The host device 1302 and the memory card 1304 may communicate using SD bus protocol as described in the SD standard. In one example implementation, the host device 1302 may have an SD slot and have SD driver software installed thereon to control the operation of the memory card 1304. The host device 1302 is an electronic device using the memory card 1304 inserted therein. The card interface 1316 makes electrical connection with the host interface 1310 when the memory card 1304 is inserted into the host device 1302. A data line 1318 connects a respective data pin of the host interface 1310 with a respective data pin of the card interface 1316. A clock line 1320 connects a respective clock pin of the host interface 1310 with a respective clock pin of the card interface 1316. A command line 1322 connects a respective command pin of the host interface 1310 with a respective command pin of the card interface 1316.

The host device 1302 generates a data block and transmits the data block to the memory card 1304 via the data line 1318. The data block includes, but is not limited to, a command register, a password length of a user-defined current password, a password length of a user-defined new password, the user-defined current password, the user-defined new password, and a user-defined address range field including start and end addresses of the defined space.

The card processor 1312 receives the data block via the card interface 1316. The data block includes at least a user-defined current password, a user-defined new password, a password length of the user-defined current password, a password length of the user-defined new password, and a user-defined address range field including a start address and an end address of a defined space in the memory device. The card processor 1312 retrieves a current password of the defined space already stored in the m and a password length of the current password associated with the defined space from the memory card 1304. The card processor 1312 then matches the password length of the user-defined current password and a current password length of the current password for the defined space and compares the user-defined current password and the stored current password of the defined space. The card processor 1312 also matches the user-defined address range field with an address range field of the defined space stored in the card memory 1314 and compare the user-defined current password and the current password of the defined space. The card processor 1312 replaces the current password of the defined space with the user-defined new password based, at least in part, on the match and comparison. The card processor 1312 stores the user-defined new password of the defined space into the memory when the password length of the user-defined current password matches the current password length of the current password, and the user-defined address range field of the defined space being not matched with any address range fields of a plurality of defined spaces of the memory.

Figure 14:
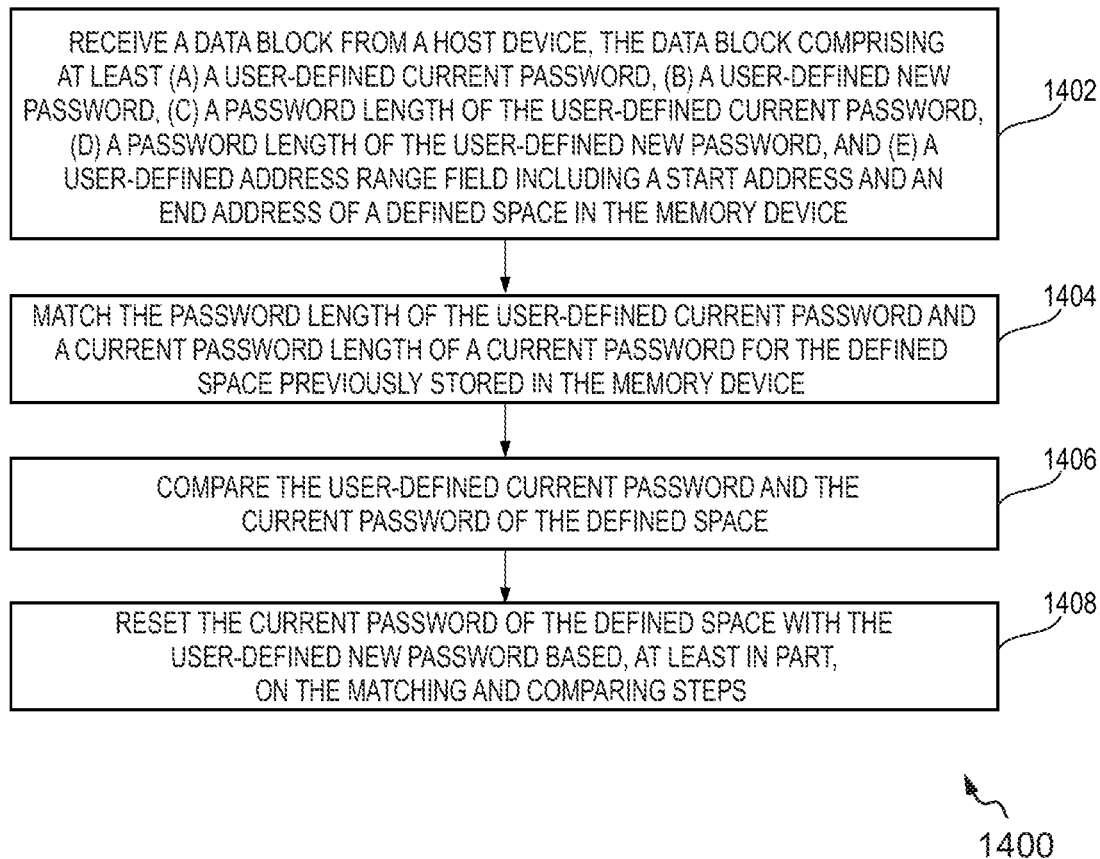
FIG. 14 is a flow chart illustrating a method of password protection of defined spaces in a memory device and a memory card system in accordance with an embodiment of the present disclosure.

Referring now to FIG. 14, a flow chart of a method 1400 of password protection of defined spaces in the memory card 1304 is shown in accordance with an embodiment of the present disclosure.

Operation 1402 of the method 1400 includes receiving a data block from a host device. The data block includes at least (a) a user-defined current password, (b) a user-defined new password, (c) a password length of the user-defined current password, (d) a password length of the user-defined new password, and (e) a user-defined address range field including a start address and an end address of a defined space in the memory device. In one example, it may be assumed that a current password of the defined space is "567" and a current password length of the current password is "3." The data block may include the user-defined current password as "5678", which has an extra character i.e. "8" and a user-defined new password i.e. "3456" and a password length of the user-defined new password i.e. "4."

Operation 1404 includes matching the password length of the user-defined current password and a current password length of a current password for the defined space already stored in the memory card 1304.

Operation 1406 includes comparing the user-defined current password and the current password of the defined space. Operation 1408 includes resetting the current password of the defined space with the user-defined new password based, at least in part, on the matching and comparing steps.

It should be noted that the operations 1406 and 1408 can be performed in any order or simultaneously. In the above example, if the current password length of the current password i.e. "3" and the password length of the user-defined current password i.e. "4" do not match, therefore, the password reset operation is not performed for the defined space of the memory card 1304.

Various embodiments described herein offer multiple advantages and technical effects. For instance, the described embodiments utilize a plurality of new command data block structures to avoid incorrect password resetting problem, while resetting current password of the memory device as well as a defined space of the memory device. By calculating the password length of the user-defined current password by the host device and storing a password length of a current password along with the current password in the memory, the need of calculating password lengths of the current password and new password is eliminated, thereby reducing computations at the memory card system. Further, the embodiments described herein also enhances overall data security of a specific address range of the memory card system.

As used here, the term "SD standard" used throughout the description refers to the "SD Flash Memory Card" standard introduced by Matsushita®, SanDisk®, and Toshiba® in the year 2000 and subsequent revisions to the standard including the latest revision as set forth in Secure Digital Association Physical Layer Specification version 6.0 issued by the SD card association dated Dec. 8, 2016.

Further, as used herein, the term "user-defined" used throughout the description refers to values defined by or entered by a user. For instance, "user-defined current password" may be understood as a current password that is provided by the user via a user interface. Further, "user-defined password length" refers to a password length that is provided by the user. For example, the term "user-defined" can also refer to values that are calculated by an automated or semi-automated system or means.

Further, the term "defined space" used herein refers to a memory region of a plurality of memory regions (e.g., memory region-0, memory region-1, memory region-2, through memory region-n, where 'n' can be an integer number) logically partitioned in the memory device.

Although the present technology has been described with reference to specific exemplary embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various modules and methods may be embodied using transistors, logic gates, and electrical circuits (e.g., application specific integrated circuit (ASIC) circuitry and/or in Digital Signal Processor (DSP) circuitry).

Also, techniques, subsystems and methods described and illustrated in the various embodiments as discrete or separate may be combined or integrated with other systems, modules, techniques, or methods without departing from the scope of the present technology. Other items shown or discussed as directly coupled or connected with one another, or as directly communicating with each other, may be communicatively associated through some interface or device, such that the items may no longer be considered directly coupled or connected with one another, or directly communicating with each other, but may still be indirectly communicatively associated and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment. Various embodiments described herein may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The foregoing Detailed Description has been presented for purposes of illustration and description. It is not intended to be exhaustive or to limit the disclosure to the precise form described. Many modifications and variations are possible in light of the above teaching. The described embodiments were chosen to explain the principles of the disclosure and its practical application, to thereby enable others skilled in the art to best utilize the disclosure in various embodiments and with various modifications as are suited to the particular use contemplated.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method of password protection of defined spaces in a memory device, the method comprising:
   receiving a data block from a host device, the data block comprising at least (a) a user-defined current password, (b) a user-defined new password, (c) a password length of the user-defined current password, (d) a password length of the user-defined new password, and (e) a user-defined address range field including a start address and an end address of a defined space in the memory device;
   matching the password length of the user-defined current password and a current password length of a current password for the defined space previously stored in the memory device;
   comparing the user-defined current password and the current password of the defined space; and
   resetting the current password of the defined space with the user-defined new password based on a result of the matching and a result of the comparing.

2. The method of claim 1, further comprising:
   determining a match between the user-defined address range field and a plurality of address range fields of a plurality of defined spaces stored in the memory device; and
   accessing the current password stored with an address range field from among the plurality of address range fields, wherein the address range field is of the defined space.

3. The method of claim 2, further comprising:
   replacing the current password with the user-defined new password of the defined space after the resetting step, wherein the resetting step is performed when:
   the password length of the user-defined current password matches the current password length of the current password;
   the user-defined current password is the same as the stored current password of the defined space; and
   the user-defined address range field is determined to be matching with the address range field of the defined space.

4. The method of claim 2, further comprising setting an error bit stored in a status register in the memory device based on occurrence of at least one of:
   the password length of the user-defined current password being different from the current password length of the current password;
   the user-defined current password being different from the current password; and
   the user-defined address range field determined to be not matching with any address range field from among the plurality of address range fields.

5. The method of claim 1, wherein the data block further comprises a command register, and wherein a reserved bit of the command register is set to indicate presence of the user-defined address range field of the defined space in the data block.

6. The method of claim 5, wherein when the reserved bit is set to a first binary value, the current password of the defined space of the memory device is reset, and wherein when the reserved bit is set to a second binary value, the user-defined address range field is discarded and the current password is reset for entire memory space of the memory device.

7. The method of claim 1, wherein the data block is a first data block, and wherein the method further comprising:
receiving a second data block from the host device for performing a memory access operation within the defined space of the memory device, the second data block comprising a user-defined current password of the defined space, and a user-defined address range field of the defined space;
matching the user-defined current password present in the second data block and the current password of the defined space; and
enabling the memory access operation within the defined space of the memory device when the user-defined current password present in the second data block matches with the current password and the user defined address range field in the another data block is a valid address range field,
wherein the memory access operation is at least one of: a read operation, a write operation, and an erase operation.

8. The method of claim 1, wherein the memory device is a secure digital (SD) memory card that operates in compliance with an SD standard.

9. A memory device, comprising:
a memory for storing data; and
a controller operatively coupled to the memory via a memory interface, the controller configured to:
receive a data block from a host device, the data block comprising at least (a) a user-defined current password, (b) a user-defined new password, (c) a password length of the user-defined current password, (d) a password length of the user-defined new password, and (e) a user-defined address range field including a start address and an end address of a defined space in the memory device;
match the password length of the user-defined current password and a current password length of a current password for the defined space already stored in the memory;
compare the user-defined current password and the current password of the defined space; and
reset the current password of the defined space with the user-defined new password based on a result of the match and a result of the comparing.

10. The memory device of claim 9, wherein the memory device is a secure digital (SD) memory device that operates in compliance with an SD standard.

11. The memory device of claim 9, wherein the controller comprises at least one of:
a command handler for parsing the received data block;
a password retriever for retrieving the current password of the defined space and the current password length of the current password of the defined space from the memory; and
a password authenticator for receiving parsed data block information and configured to:
determine a match between the user-defined address range field a plurality of address range fields of a plurality of defined spaces stored in the memory device, and
matching the password length of the user-defined current password with the current password length of the current password.

12. The memory device of claim 11, wherein the password authenticator is further configured to:
store the user-defined new password of the defined space in place of the current password in the memory after the reset of the current password, wherein the resetting is performed when:
the password length of the user-defined current password matches the current password length of the current password;
the user-defined current password is the same as the stored current password of the defined space; and
the user-defined address range field is determined to be matching with the address range field of the defined space.

13. The memory device of claim 12, wherein the password authenticator is configured to set an error bit stored in a status register based on occurrence of at least one of:
the password length of the user-defined current password being different from the current password length of the current password;
the user-defined current password being different from the current password; and
the user-defined address range field determined to be not matching with any address range field from among the plurality of address range fields.

14. The memory device of claim 9, wherein the data block further comprises a command register, and wherein a reserved bit of the command register is set to indicate presence of the user-defined address range field of the defined space in the data block.

15. The memory device of claim 9, wherein the data block is a first data block and wherein the controller is further configured to:
receive a second data block from the host device for performing a memory access operation within the defined space of the memory device, the another data block comprising a user-defined current password of the defined space, and a user-defined address range field of the defined space;
match the user-defined current password present in the second data block and the current password of the defined space; and
enable the memory access operation within the defined space of the memory device when the user-defined current password present in the second data block matches with the current password and the user defined address range field in the another data block is a valid address range field.

16. The memory device of claim 15, wherein the memory access operation is at least one of read, write and erase.

17. A memory card system, comprising:
a memory card comprising a memory for storing data; and
a control means operatively coupled to the memory by way of a memory interface, wherein the control means comprises means for:
receiving a data block via a card interface, wherein the data block comprises at least (a) a user-defined current password, (b) a user-defined new password, (c) a password length of the user-defined current password, (d) a password length of the user-defined new password, and (e) a user-defined address range field including a start address and an end address of a defined space in the memory,
matching the password length of the user-defined current password and a current password length of a current password for the defined space already stored in the memory, comparing the user-defined current password and the current password of the defined space, and replacing the current password of the defined space with the user-defined new password based on a result of the match and a result of the comparing.

18. The memory card system of claim 17, wherein the control means further comprises:

means for storing the user-defined new password of the defined space into the memory after replacing, wherein the replacing is performed when:

the password length of the user-defined current password matches the current password length of the current password, the user-defined current password is the same as the stored current password of the defined space, and the user-defined address range field is determined to be matching with the address range field of the defined space.

19. The memory card system of claim 17, further comprising a host device comprising:

a host processor; and a host memory having a sequence of instructions stored thereon, wherein execution of the sequence of instructions causes the host processor to generate the data block and transmit the data block from the host device to the memory via a host interface.

20. The memory card system of claim 17, wherein the memory card is a Secure Digital (SD) memory card and the memory card system operates in compliance with an SD standard.

* * * * *